(12) United States Patent
Kim (10) Patent No.: US 9,530,403 B2
(45) Date of Patent: Dec. 27, 2016

(54) TERMINAL AND SERVER OF SPEAKER-ADAPTATION SPEECH-RECOGNITION SYSTEM AND METHOD FOR OPERATING THE SYSTEM

(71) Applicant: ELECTRONICS AND TELECOMMUNICATIONS RESEARCH INSTITUTE, Daejeon (KR)

(72) Inventor: Dong Hyun Kim, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/709,359

(22) Filed: May 11, 2015

(65) Prior Publication Data

US 2015/0371634 A1 Dec. 24, 2015

(30) Foreign Application Priority Data

Jun. 18, 2014 (KR) ........................ 10-2014-0074238

(51) Int. Cl.
*G10L 15/02* (2006.01)
*G10L 15/07* (2013.01)
(Continued)

(52) U.S. Cl.
CPC ............... *G10L 15/07* (2013.01); *G10L 15/30* (2013.01); *G10L 2015/221* (2013.01)

(58) Field of Classification Search
CPC ........ G10L 15/20; G10L 15/065; G10L 15/07; G10L 15/30; G10L 15/00; G10L 15/02; G10L 15/22; G10L 15/26; G10L 15/06; G10L 15/063; G10L 15/08; H04M 2201/40

(Continued)

(56) References Cited

U.S. PATENT DOCUMENTS 5,457,768 A * 10/1995 Tsuboi .................... G10L 15/18
704/219
2002/0120444 A1* 8/2002 Botterweck .......... G06K 9/6247
704/236

(Continued)

FOREIGN PATENT DOCUMENTS

CN 101320560 A * 12/2008
JP 2012-063537 A 3/2012

(Continued)

*Primary Examiner* — Marivelisse Santiago Cordero
*Assistant Examiner* — Stephen Brinich (57) ABSTRACT

Provided are a terminal and server of a speaker-adaptation speech-recognition system and a method for operating the system. The terminal in the speaker-adaptation speech-recognition system includes a speech recorder which transmits speech data of a speaker to a speech-recognition server, a statistical variable accumulator which receives a statistical variable including acoustic statistical information about speech of the speaker from the speech-recognition server which recognizes the transmitted speech data, and accumulates the received statistical variable, a conversion parameter generator which generates a conversion parameter about the speech of the speaker using the accumulated statistical variable and transmits the generated conversion parameter to the speech-recognition server, and a result displaying user interface which receives and displays result data when the speech-recognition server recognizes the speech data of the speaker using the transmitted conversion parameter and transmits the recognized result data.

17 Claims, 5 Drawing Sheets

(51) Int. Cl.
*G10L 15/30* (2013.01)
*G10L 15/22* (2006.01)

(58) Field of Classification Search
USPC ....... 704/233, 240, 231, 251, 239, 235, 255,
704/246, 275, E15.039, E15.001,
704/E15.008, 243–244; 379/88.01
See application file for complete search history.

(56) References Cited

U.S. PATENT DOCUMENTS

| | | | |
|---|---|---|---|
| 2002/0120450 A1* | 8/2002 | Junqua | G10L 13/04 704/258 |
| 2003/0012347 A1* | 1/2003 | Steinbiss | G10L 15/065 379/88.01 |
| 2007/0129946 A1* | 6/2007 | Ma | G10L 13/027 704/256 |
| 2008/0065380 A1 | 3/2008 | Kwak et al. | |
| 2008/0228483 A1* | 9/2008 | Chen | G10L 15/30 704/251 |
| 2013/0138437 A1 | 5/2013 | Cho et al. | |

FOREIGN PATENT DOCUMENTS

| KR | 10-2005-0021392 A | 3/2005 |
|---|---|---|
| KR | 10-2007-0060581 A | 6/2007 |
| KR | 10-1281958 B1 | 7/2013 |

\* cited by examiner

TERMINAL AND SERVER OF SPEAKER-ADAPTATION SPEECH-RECOGNITION SYSTEM AND METHOD FOR OPERATING THE SYSTEM

CROSS-REFERENCE TO RELATED APPLICATION

This application claims priority to and the benefit of Korean Patent Application No. 10-2014-0074238, filed on Jun. 18, 2014, the disclosure of which is incorporated herein by reference in its entirety.

BACKGROUND

1. Field of the Invention

The present invention relates to a speech-recognition system based on speaker-adaptation, and more particularly, to a speech-recognition system in which speaker-adaptation is gradually performed on a terminal of a user and recognition of speech spoken by a speaker is performed on a speech-recognition server using speaker-adapted information.

2. Discussion of Related Art

The conventional speech-recognition systems are each configured of a speech recording program installed in the user's terminal and an online server which recognizes the user's speech using a variety of speech recognition algorithms and memory resources. This configuration has been developed in a direction to increase the performance of speech recognition in consideration of characteristics of the individual user so as to satisfy an environment in which the resources of the online server are more readily used and an environment in which the terminal size is further reduced, and to this end, speaker-adaptation techniques are being used.

The speaker-adaptation techniques are techniques in which a difference between speech spoken by the speaker and an acoustic model is changed and reduced so as to be adapted to a speech characteristic of the speaker, which use a variety of methods such as a maximum a posteriori (MAP) method, a maximum likelihood linear regression (MLLR) method, a maximum a posteriori linear regression (MAPLR) method, an Eigen-voice method, etc.

In order to use the speaker-adaptation techniques in the conventional speech-recognition system using the online server, two factors are needed. The first factor is to provide adaptation data and correct answer transcriptions, and the second factor is to provide a speaker identifier (ID) to identify the speaker.

Specifically, the first factor is often used when a pre-learning process for speaker-adaptation is configured in the speech-recognition system, and in this case, the pre-learning process refers to spoken words or phrases in which the correct answer transcriptions are given in advance by the user and performing the speaker-adaptation. The second factor is often used when a speech-recognition device of the online server is used unlike the case in which the speech-recognition device is configured in the terminal itself and there is no need to identify the speaker. In this case, since the adaptation appropriate for the speaker may be performed after the speaker of the terminal connected to the server is identified, the speaker ID is needed.

However, since the method of performing the pre-learning process or providing the speaker ID is not only cumbersome but also requires a space allocated for each speaker in the server, there exists a problem that can lead to data overload.

SUMMARY OF THE INVENTION

The present invention is directed to a speech-recognition system in which statistical variables required for speaker-adaptation are extracted from speech recognition results, the extracted statistical variables are continuously accumulated and stored in a terminal, and thus speech of a speaker is recognized using information generated from the accumulated statistical variables when a speech-recognition server recognizes the speech of the speaker.

According to an aspect of the present invention, there is provided a terminal in a speaker-adaptation speech-recognition system, including: a speech recorder which transmits speech data of a speaker to a speech-recognition server; a statistical variable accumulator which receives a statistical variable including acoustic statistical information about speech of the speaker from the speech-recognition server which recognizes the transmitted speech data, and accumulates the received statistical variable; a conversion parameter generator which generates a conversion parameter about the speech of the speaker using the accumulated statistical variable and transmits the generated conversion parameter to the speech-recognition server; and a result displaying user interface which receives and displays result data when the speech-recognition server recognizes the speech data of the speaker using the transmitted conversion parameter and transmits the recognized result data.

According to another aspect of the present invention, there is provided a method of operating a terminal in a speaker-adaptation speech-recognition system, including: transmitting speech data of a speaker to a speech-recognition server; when a statistical variable including acoustic statistical information about speech of the speaker is received from the speech-recognition server which recognizes the received speech data, accumulating the received statistical variable; generating a conversion parameter about the speech of the speaker using the accumulated statistical variable and transmitting the generated conversion parameter to the speech-recognition server; and when the speech-recognition server recognizes the speech data of the speaker using the received conversion parameter and transmits the recognized result data, receiving and displaying the result data.

According to still another aspect of the present invention, there is provided a server in a speaker-adaptation speech-recognition system, including: a speech recognizer which receives speech data of a speaker from a terminal, performs speech recognition, and outputs result data of the performed speech recognition; a statistical variable generator which generates a statistical variable including acoustic statistical information about speech of the speaker using the output result data; and a statistical variable transmitter which accumulates the generated statistical variable in the terminal, wherein the speech recognizer, when the terminal generates a conversion parameter about the speech of the speaker using the accumulated statistical variable, receives the generated conversion parameter from the terminal and recognizes the speech data spoken by the speaker.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and methods of accomplishing them will be made apparent with reference to the accompanying drawings and some embodiments to be described below. The present invention may, however, be embodied in various different forms, and should be construed as limited, not by the embodiments set forth herein, but only by the accompanying claims. Rather, these embodiments are provided so that this disclosure is thorough and complete and fully conveys the present invention to those skilled in the art.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Figure 1:
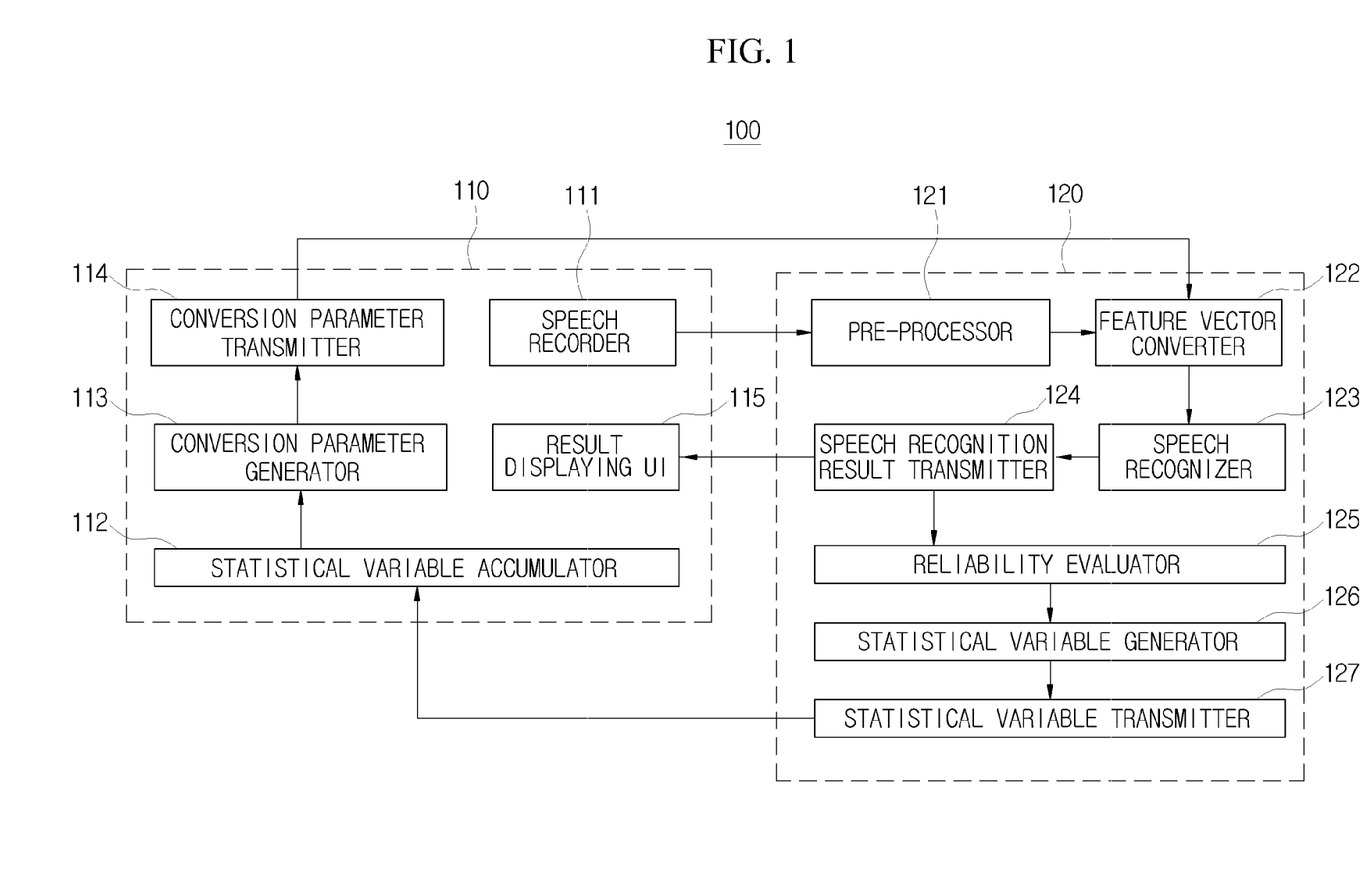
FIGS. 1 to 3 are block diagrams showing configurations of speech-recognition systems based on speaker-adaptation according to exemplary embodiments of the present invention.

FIG. 1 is a block diagram showing a configuration of a speech-recognition system based on speaker-adaptation according to an exemplary embodiment of the present invention.

As shown in FIG. 1, the speech-recognition system 100 according to the exemplary embodiment of the present invention includes a terminal 110 of a speaker and a speech-recognition server 120.

The terminal 110 is a device that records speech of the speaker and displays speech recognition results, which includes a speech recorder 111, a statistical variable accumulator 112, a conversion parameter generator 113, a conversion parameter transmitter 114, and a result displaying user interface (UI) 115.

The speech recorder 111 records the speech spoken by the speaker, and transmits the recorded speech data to the speech-recognition server 120 using wired and wireless communication methods.

The statistical variable accumulator 112 receives statistical variables including acoustic statistical information about the speech of the speaker from the speech-recognition server 120 which recognizes the speech data of the speaker, and accumulates and stores the received statistical variables.

In this case, the statistical variables are added to the previously stored statistical variables and stored by being assigned a weight ($\Delta$), which give an effect of corresponding to recent environmental changes faster than a cumulative effect of the statistical variables by weighting the recently input statistical variable with an assigned weight ($\Delta$) greater than 0.5 and give the cumulative effect of the statistical variables rather than the effect corresponding to the recent environmental changes when the assigned weight ($\Delta$) is equal to 0.5. To this end, the statistical variables to which the weight ($\Delta$) is applied may be calculated using Equation 1 and Equation 2.

$$\tilde{G}_i = (1-\Delta)\tilde{G}_i + \Delta G_i \qquad \text{[Equation 1]}$$

$$\tilde{K}_i = (1-\Delta)\tilde{K}_i + \Delta K_i \qquad \text{[Equation 2]}$$

Here, $G_i$ and $K_i$ refer to statistical variables calculated by assuming the case in which a feature space maximum likelihood linear regression (fMLLR) method is used in feature vector adaptation, and $\tilde{G}_i$ and $\tilde{K}_i$ refer to statistical variables calculated by being assigned a weight, and $\Delta$ refers to a weight greater than or equal to 0.5 and smaller than 1 ($0.5 \le \Delta \le 1$).

The conversion parameter generator 113 generates conversion parameters about the speech of the speaker using the statistical variables accumulated in the statistical variable accumulator 112, and transmits the generated conversion parameters to the speech-recognition server 120 through the conversion parameter transmitter 114.

In this case, the conversion parameter transmitter 114 may set so that the speech recorder 111 may transmit the speech data of the speaker to the speech-recognition server 120, and at the same time, may transmit the conversion parameters to the speech-recognition server 120.

For example, when the fMLLR method is used in the feature vector adaptation, an algorithm that generates the conversion parameters may be used by converting an equation for obtaining an objective function $Q(\cdot)$ into an equation for deriving a conversion parameter w.

$$Q(\cdot) = \sum_t \sum_g \log(p_i w_i') - \qquad \text{[Equation 3]}$$
$$\frac{1}{2} \sum_t \sum_g \frac{1}{\sigma_{g,i}^2} \sum_t (w_i \xi^t - \mu_{g,i})(w_i \xi^t - \mu_{g,i})$$

Here, $p_i$ refers to a row vector of an extended cofactor of the conversion parameter, and $w_i$ refers to an $i^{th}$ row vector of w. It may be summarized as shown in Equation 4 so that the conversion parameter $w_i$ may be derived by differentiating Equation 3.

$$\frac{d}{dw_i} Q(\cdot) = T\frac{p_i}{p_i w_i'} - w_i G_i + K_i = 0 \qquad \text{[Equation 4]}$$

Here, T refers to a cumulative sum of Gaussian occupation probabilities. Deriving a quadratic equation for the conversion parameter $w_i$ from Equation 4 leads to Equation 5, and thus the conversion parameter $w_i$ of an $i^{th}$ row vector may be calculated.

$$w_i = \left( \frac{-p_i G_i^{-1} k_i' \pm \sqrt{(p_i G_i^{-1} k_i')^2 + 4Tp_i G_i^{-1} p_i'}}{2 p_i G_i^{-1} p_i'} p_i + k_i \right) G_i^{-1} \qquad \text{[Equation 5]}$$

As described above, when the accumulated statistical variables and the conversion parameters can be calculated, various algorithms such as a feature space maximum a posteriori linear regression (fMAPLR) method and a feature space minimum phone error rate (fMPE) method as well as the conventional fMLLR method used in the feature vector adaptation may be used.

When the speech-recognition server 120 recognizes the speech data of the speaker using the conversion parameters generated by the conversion parameter generator 113, the result displaying UI 115 receives the recognized result data from the speech-recognition server 120 and displays through a user interface (UI).

The speech-recognition server 120 is a server which provides a speech-recognition service, which includes a pre-processor 121, the feature vector converter 122, a speech recognizer 123, a speech recognition result transmitter 124, a reliability evaluator 125, a statistical variable generator 126, and a statistical variable transmitter 127.

The pre-processor 121 performs preprocessing on the speech data received from the terminal 110 using a method such as a noise process, a spectral normalization process, and an end point detection process, and extracts a feature vector column from the pre-processed speech data.

Here, the feature vector column is a characteristic parameter of the speech, and various methods such as a mel-frequency cepstral coefficient (MFCC) method, a perceptual linear prediction (PLP) method, and the like in order may be used to extract the feature vector column.

The feature vector converter 122 converts the feature vector extracted from the pre-processor 121 using the conversion parameters received from the terminal 110 so as to match a speech feature of the speaker. If there is no conversion parameter, the feature vector converter 122 transmits the feature vector extracted from the pre-processor 121 to the speech recognizer 123 without any conversion process.

The speech recognizer 123 recognizes the feature vector converted in the feature vector converter 122 or the feature vector extracted from the pre-processor 121 using the previously stored acoustic model and linguistic model, and transmits the recognized result data to the speech recognition result transmitter 124.

In this case, an acoustic model for speech recognition and an acoustic model for calculation of statistical variables may be differently applied. That is, a method, which may use two acoustic models, in which an acoustic model using a deep neural network is used for speech recognition, score information for measurement of the reliability of a word column is provided using the model, and then a Gaussian mixture model is used as an acoustic model for calculation of statistical variables in a subsequent operation is also available.

The speech recognition result transmitter 124 transmits the result data such as a word column recognized by the speech recognizer 123 to the reliability evaluator 125, and also transmits the result data to the terminal 110 so as to display the result data.

The reliability evaluator 125 evaluates reliability of the word column recognized by the speech recognizer 123. Specifically, the reliability evaluator 125 evaluates the reliability of the recognized word column, and assigns a weight to the corresponding word column when the evaluated reliability is greater than or equal to a preset reference value and removes the corresponding word column when the evaluated reliability is smaller than a preset reference value.

The statistical variable generator 126 generates statistical variables using the result data received from the speech recognition result transmitter 124 and the reliability of the word column evaluated in the reliability evaluator 125, and accumulates the generated statistical variables in the terminal 110 through the statistical variable transmitter 127. In this case, a method of generating the statistical variables by the statistical variable generator 126 will be described in detail with reference to FIG. 4 below.

Figure 4:
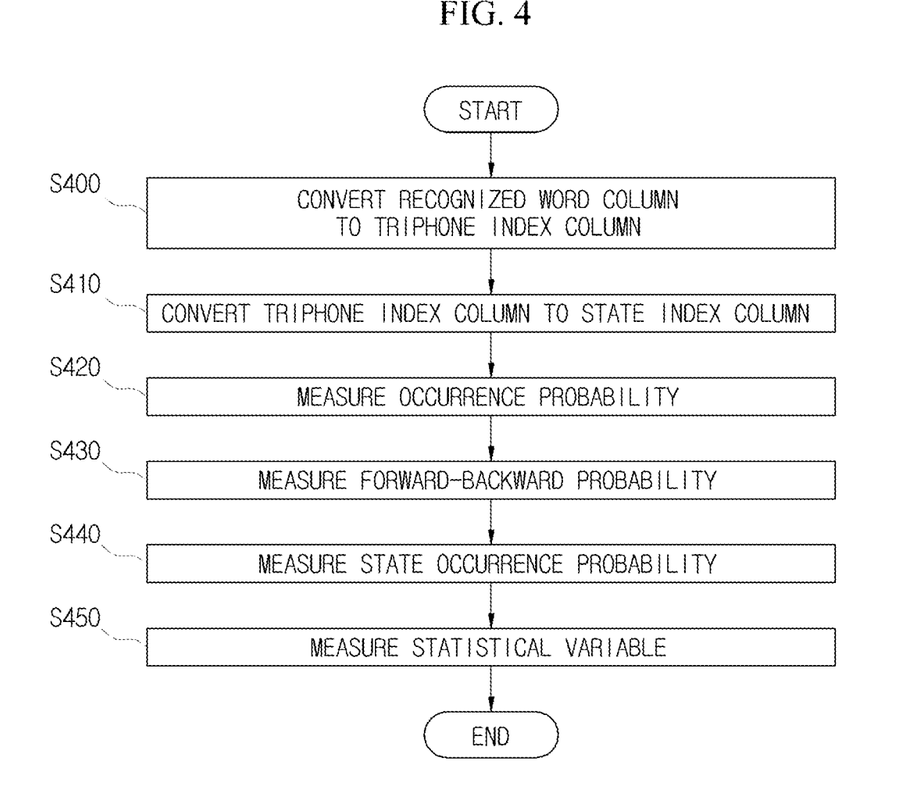
FIG. 4 is a flowchart showing a process in which a speech-recognition system based on speaker-adaptation according to an exemplary embodiment of the present invention generates statistical variables.

FIG. 4 is a flowchart showing a process in which the speech-recognition system based on speaker-adaptation according to the exemplary embodiment of the present invention generates the statistical variables.

The statistical variable generator 126 in the speech-recognition server 120 receives the recognized word column from the reliability evaluator 125 and converts the received word column to a triphone index column corresponding to phonetic symbols of the word column (S400), and converts the converted triphone index column to a corresponding state index column of the acoustic model (S410).

The statistical variable generator 126 measures a state occurrence probability using the feature vector column extracted from the speech data of the speaker by the pre-processor 121 and the converted state index column (S420).

According to another embodiment of the present invention, the speech recognizer 123 may set so that the state index column may be directly generated in order to help in generating the statistical variables and the generated state index column may be transmitted to the statistical variable generator 126.

Then, the statistical variable generator 126 measures a forward-backward probability of the state using the measured state occurrence probability (S430), and calculates a state occupation probability using the measured forward-backward probability of the state (S440).

According to another embodiment of the present invention, the statistical variable generator 126 may be set so that the state occupation probability is calculated using a Viterbi algorithm which uses only a forward probability of the state rather than a backward probability of the state.

Then, the statistical variable generator 126 measures the statistical variables using the calculated state occupation probability and a previously stored statistical value of the acoustic model (e.g., an average value and a distribution value, for a Gaussian mixture model (GMM)) (S450).

Equation 6 and Equation 7 refer to equations for calculating the statistical variables using the fMLLR method which is one of the feature vector adaptation methods.

$$G_i = \sum_g \frac{1}{\sigma_{g,i}^2} \sum_t \gamma_g^t \xi^t \xi^{t'} \qquad \text{[Equation 6]}$$

$$K_i = \sum_g \frac{1}{\sigma_{g,i}^2} \sum_t \gamma_g^t \mu_{g,i} \xi^{t'} \qquad \text{[Equation 7]}$$

Here, $G_i$ and $K_i$ refer to statistical variables calculated by assuming the case in which the fMLLR method is used in feature vector adaptation, and $\mu_{g,i}$ and $\sigma_{g,i}^2$ refer to values of $i^{th}$ order of mean Gaussian vector and Gaussian distribution vector, respectively. $\gamma_g^t$ refers to a Gaussian occupation probability g in a $t^{th}$ frame $\xi^t$ and refers to a vector in which an nth dimension of the feature vector input in the $t^{th}$ frame t expands to an $(n+1)^{th}$ dimension which is a dimension including a default value 1.

The embodiment of the present invention may provide the speech-recognition system 100 having a structure in which the speech-recognition server 120 generates the statistical variables using the result of speech recognition, the terminal 110 accumulates the generated statistical variables and generates the conversion parameters using the accumulated statistical variables, and then the speech-recognition server 120 recognizes the speech of the speaker using the conversion parameters. Since such a structure is sequentially rotated, the speech-recognition system 100 may be gradually adapted to the speaker.

Figure 2:
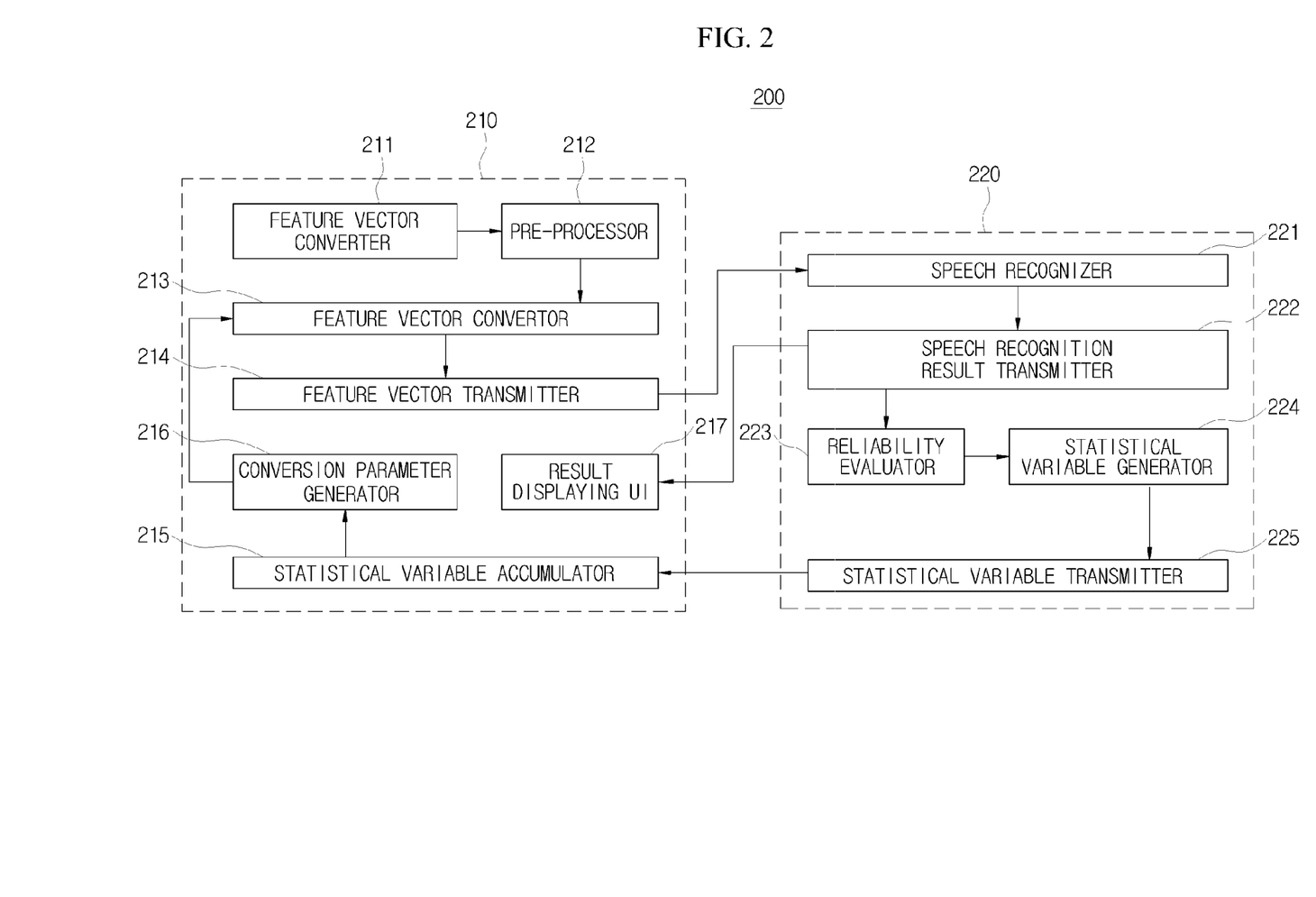

FIG. 2 is a block diagram showing a configuration of a speech-recognition system based on speaker-adaptation in which a pre-processor and feature vector converter included in a speech-recognition server are implemented on a terminal according to another exemplary embodiment of the present invention.

According to the embodiment of the present invention, the pre-processor 121 and feature vector converter 122 included in the speech-recognition server 120 may be implemented in the terminal 100 and thus preprocessing of the recorded speech data and extracting of the feature vector may be performed in the terminal 110, and the extracted feature vector may be transmitted to the speech-recognition server 120 so as to perform speech recognition. Therefore, the speech-recognition system provides an advantage of reducing an amount of data transmitted from the terminal 110 to the speech-recognition server 120.

As shown in FIG. 2, a speech recorder 211 in a terminal 210 records speech spoken by the speaker, and transmits the recorded speech data to a pre-processor 212.

The pre-processor 212 performs a preprocessing on the speech data received from the speech recorder 211 using a method such as a noise process, a spectral normalization process, and an end point detection process, extracts a feature vector column from the pre-processed speech data, and transmits the extracted feature vector column to a feature vector convertor 213.

The feature vector convertor 213 converts the feature vector extracted from the pre-processor 212 using conversion parameters generated by a conversion parameter generator 216 so as to match a speech feature of the speaker, and transmits the converted feature vector to a speech-recognition server 220 through a feature vector transmitter 214. If there is no pre-generated conversion parameter, the feature vector convertor 213 transmits the feature vector extracted by the pre-processor 212 to the speech-recognition server 220 through the feature vector transmitter 214 without any conversion process.

A speech recognizer 221 in the speech-recognition server 220 performs speech recognition on the feature vector received from the terminal 210 using the previously stored acoustic model and linguistic model, and transmits the speech recognition results to the terminal 210 through a speech recognition result transmitter 222 so as to be displayed to the speaker.

Figure 3:
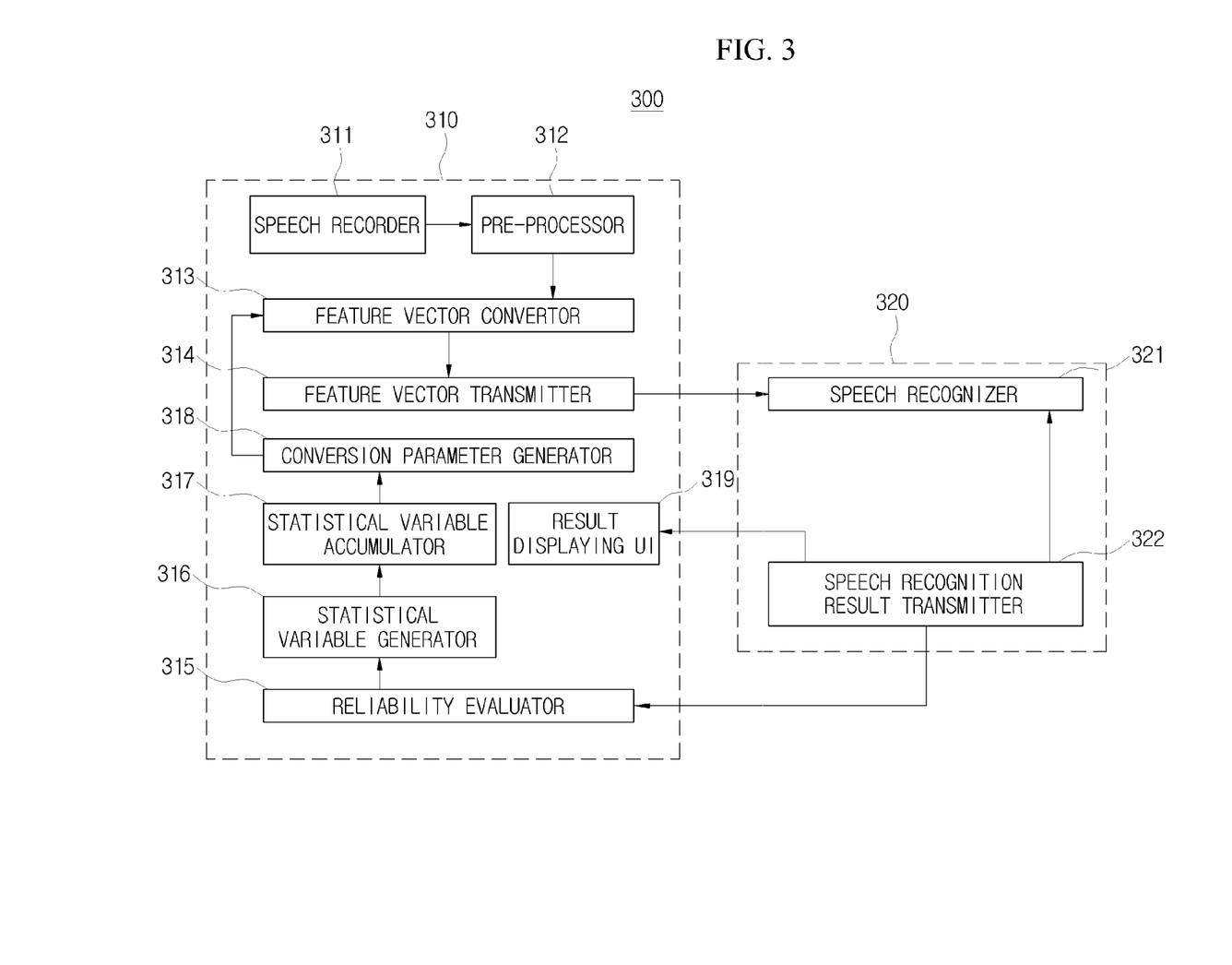

FIG. 3 is a block diagram showing a configuration of a speech-recognition system based on speaker-adaptation in which a pre-processor, a feature vector converter, a reliability evaluator, and a statistical variable generator included in a speech-recognition server are implemented in a terminal according to still another exemplary embodiment of the present invention.

According to the embodiment of the present invention, the pre-processor 121, feature vector converter 122, reliability evaluator 125, and statistical variable generator 126 included in the speech-recognition server 120 are implemented in the terminal 110 and thus the terminal 110 performs preprocessing the recorded speech data, extracting the feature vector, evaluating reliability of the speech recognition word column, and generating the statistical variables, and the extracted feature vector may be transmitted to the speech-recognition server 120 so as to perform speech recognition.

This configuration is a structure in which a characteristic that can support redundant speech recognition operations according to improvement of the hardware performance is considered, some memory resources of the speech-recognition server 120 are stored in the terminal 110 and used in speaker-adaptation, and thus a burden of the speech-recognition server 120 that receives requests from a plurality of terminals 110 is reduced. Thus, as the speech-recognition server 120 has a more simple structure, the configuration provides an advantage to allow the original speech recognition function to be quickly performed.

As shown in FIG. 3, a reliability evaluator 315 in a terminal 310 evaluates reliability of a word column included in result data received from a speech-recognition server 320, and transmits the evaluated reliability of the word column and the result data received from the speech-recognition server 320 to a statistical variable generator 316.

The statistical variable generator 316 generates statistical variables using the reliability of the word column evaluated in the reliability evaluator 315 and the result data received from the reliability evaluator 315, and accumulates the generated statistical variables in a statistical variable accumulator 317.

A speech recognition result transmitter 322 in the speech-recognition server 320 transmits the result data such as the word column recognized in a speech recognizer 321 to the terminal 310 to be displayed to the speaker or allows the terminal 310 to generate the statistical variables using the received result data.

An embodiment of the present invention may be implemented in a computer system, e.g., as a computer readable medium.

Figure 5:
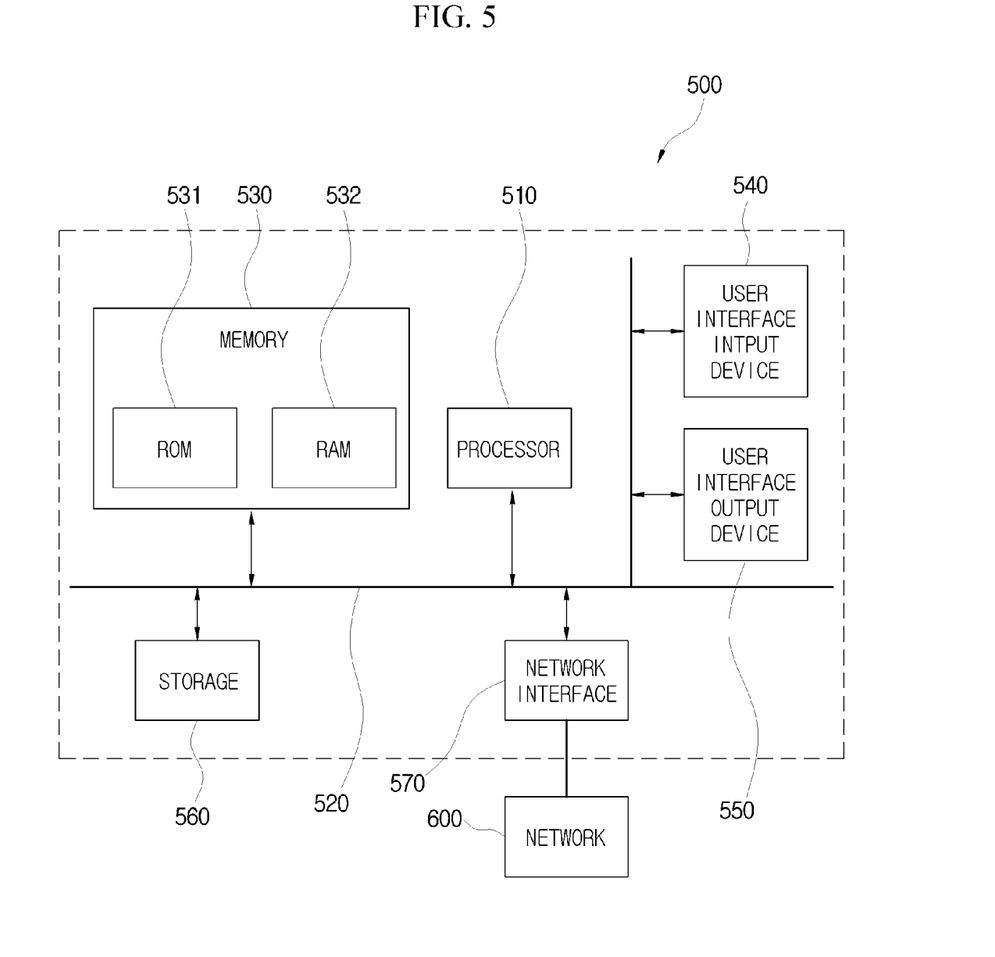
FIG. 5 is a block diagram illustrating a computer system to which the present invention is applied.

FIG. 5 is a block diagram illustrating a computer system to which the present invention is applied.

As shown in FIG. 5, a computer system 500 may include one or more of a processor 510, a memory 530, a user input device 540, a user output device 550, and a storage 560, each of which communicates through a bus 520. The computer system 500 may also include a network interface 570 that is coupled to a network 600. The processor 510 may be a central processing unit (CPU) or a semiconductor device that executes processing instruction stored in the memory 530 and/or the storage 560. The memory 530 and the storage 560 may include various forms of volatile or non-volatile storage media. For example, the memory 530 may include a read-only memory (ROM) 531 and a random access memory (RAM) 532.

According to the embodiments of the present invention, the speaker-adaptation speech-recognition system provides an advantage of recognizing speech spoken by a speaker using accumulated and stored statistical variables in a terminal without performing an unnecessary pre-learning process or giving a speaker ID. Further, since information required for speaker-adaptation is also stored in the terminal, an amount of information stored in a server can be reduced and thus a burden of the server can be reduced. The system also provides an advantage that an inconvenience of transmitting or receiving personal information to or from the server for speech-recognition can be reduced in view of the speaker.

While the present invention has been particularly described with reference to exemplary embodiments, it will be understood by those of skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

What is claimed is:

1. A terminal in a speaker-adaptation speech-recognition system, comprising:
   a speech recorder configured to transmit speech data of a speaker to a speech-recognition server;
   a statistical variable accumulator configured to receive a statistical variable including acoustic statistical information about speech of the speaker from the speech-recognition server which recognizes the transmitted speech data, and accumulate the received statistical variable;
   a conversion parameter generator configured to generate a conversion parameter about the speech of the speaker using the accumulated statistical variable and transmit the generated conversion parameter to the speech-recognition server;
   a result displaying user interface configured to receive and display result data when the speech-recognition server recognizes the speech data of the speaker using the transmitted conversion parameter and transmits the recognized result data;
   a pre-processor configured to extract a feature vector from the speech data; and
   a feature vector converter configured to convert the extracted feature vector using the conversion parameter so as to match a speech feature of the speaker.

2. The terminal of claim 1, wherein the pre-processor performs preprocessing on the speech data using at least one of a noise process, a spectral normalization process, and an end point detection process, and extracts a feature vector from the pre-processed speech data.

3. The terminal of claim 1, wherein the feature vector converter, when the pre-processor extracts the feature vector, converts the extracted feature vector using the conversion parameter generated by the conversion parameter generator so as to match the speech feature of the speaker.

4. The terminal of claim 1, further comprising:
   a reliability evaluator configured to receive the recognized result data of the speech data from the speech-recognition server, and evaluate reliability of a word column included in the result data; and
   a statistical variable generator configured to generate the statistical variable using the result data and the evaluated reliability.

5. The terminal of claim 4, wherein the reliability evaluator assigns a weight to the corresponding word column when the evaluated reliability is greater than or equal to a preset reference value, and removes the corresponding word column when the evaluated reliability is smaller than the preset reference value.

6. The terminal of claim 4, wherein the statistical variable generator generates the statistical variable using at least one of an acoustic model and a linguistic model corresponding to the word column included in the result data.

7. A method of operating a terminal in a speaker-adaptation speech-recognition system, comprising:
   transmitting speech data of a speaker to a speech-recognition server;
   when a statistical variable including acoustic statistical information about speech of the speaker is received from the speech-recognition server which recognizes the received speech data, accumulating the received statistical variable;
   generating a conversion parameter about the speech of the speaker using the accumulated statistical variable and transmitting the generated conversion parameter to the speech-recognition server;
   when the speech-recognition server recognizes the speech data of the speaker using the received conversion parameter and transmits the recognized result data, receiving and displaying the result data;
   extracting a feature vector from the speech data;
   converting the extracted feature vector using the conversion parameter so as to match a speech feature of the speaker; and
   transmitting the feature vector converted to match the speech feature of the speaker and the speech data to the speech-recognition server.

8. The method of claim 7, wherein the extracting of the feature vector from the speech data comprises:
   preprocessing the speech data of the speaker using at least one of a noise process, a spectral normalization process, and an end point detection process; and
   extracting the feature vector from the pre-processed speech data of the speaker.

9. The method of claim 7, wherein the transmitting of the generated conversion parameter to the speech-recognition server includes transmitting the conversion parameter to the speech-recognition server when the speech data is transmitted to the speech-recognition server.

10. The method of claim 7, wherein the accumulating of the received statistical variable comprises:
    assigning a weight to the statistical variable; and
    storing a sum of the weighted statistical variable and a previously stored statistical variable.

11. A server in a speaker-adaptation speech-recognition system, comprising:
    a speech recognizer configured to receive speech data of a speaker from a terminal, perform speech recognition, and output result data of the performed speech recognition;
    a statistical variable generator configured to generate a statistical variable including acoustic statistical information about speech of the speaker using the output result data; and
    a statistical variable transmitter configured to accumulate the generated statistical variable in the terminal;
    a reliability evaluator configured to evaluate reliability of a word column included in the result data, assign a weight to the word column according to the evaluated reliability, and transmit the weighted word column to the statistical variable generator,
    wherein the speech recognizer, when the terminal generates a conversion parameter about the speech of the speaker using the accumulated statistical variable, receives the generated conversion parameter from the terminal and recognizes the speech data spoken by the speaker.

12. The server of claim 11, further comprising:
    a pre-processor configured to perform preprocessing the speech data using at least one of a noise process, a spectral normalization process, and an end point detection process, and extract a feature vector from the pre-processed speech data of the speaker; and
    a feature vector converter configured to convert the extracted feature vector using the conversion parameter so as to match a speech feature of the speaker.

13. The server of claim 11, wherein the speech recognizer, when the speech data is received from the terminal, receives the conversion parameter from the terminal.

14. The server of claim 11, wherein the speech recognizer, when there is no conversion parameter received from the terminal, performs speech recognition on the speech data using the feature vector and transmits result data of the performed speech recognition to the terminal.

15. The server of claim 11, wherein the reliability evaluator assigns a weight to the corresponding word column when the evaluated reliability is greater than or equal to a preset reference value, and removes the corresponding word column when the evaluated reliability is smaller than the preset reference value.

16. The server of claim 11, wherein the statistical variable generator generates the statistical variable using at least one of an acoustic model and a linguistic model corresponding to the word column included in the result data.

17. The server of claim 11, wherein the statistical variable generator calculates a state occupation probability of the word column using the word column included in the result data, and measures the statistical variable using the calculated state occupation probability and a previously stored statistical value of an acoustic model.

* * * * *